US012354586B2

(12) United States Patent
Hsu et al.

(10) Patent No.: US 12,354,586 B2
(45) Date of Patent: Jul. 8, 2025

(54) SYSTEM AND METHOD OF ACTIVE NOISE CANCELLATION IN OPEN FIELD

(71) Applicant: RelaJet Tech (Taiwan) Co., Ltd., Taipei (TW)

(72) Inventors: Yun-Shu Hsu, Taipei (TW); Po-Ju Chen, Taipei (TW)

(73) Assignee: Relajet Tech (Taiwan) Co., Ltd., Taipei (TW)

( * ) Notice: Subject to any disclaimer, the term of this patent is extended or adjusted under 35 U.S.C. 154(b) by 273 days.

(21) Appl. No.: 17/794,612

(22) PCT Filed: Jan. 22, 2021

(86) PCT No.: PCT/US2021/014793
§ 371 (c)(1),
(2) Date: Jul. 21, 2022

(87) PCT Pub. No.: WO2021/151023
PCT Pub. Date: Jul. 29, 2021

(65) Prior Publication Data

US 2023/0116061 A1 Apr. 13, 2023

Related U.S. Application Data

(60) Provisional application No. 62/964,585, filed on Jan. 22, 2020.

(51) Int. Cl.
*G10K 11/178* (2006.01)

(52) U.S. Cl.
CPC .. *G10K 11/17823* (2018.01); *G10K 11/17873* (2018.01); *G10K 2210/30231* (2013.01); *G10K 2210/3027* (2013.01); *G10K 2210/3033* (2013.01); *G10K 2210/3038* (2013.01); *G10K 2210/3044* (2013.01); *G10K 2210/3045* (2013.01); *G10K 2210/3048* (2013.01)

(58) Field of Classification Search
CPC ....... G10K 11/17823; G10K 11/17873; G10K 2210/30231; G10K 2210/3027; G10K 2210/3033; G10K 2210/3038; G10K 2210/3044; G10K 2210/3045; G10K 2210/3048
USPC .......................................................... 381/71.7
See application file for complete search history.

(56) References Cited

U.S. PATENT DOCUMENTS

2007/0253561 A1 11/2007 Williams et al.
2009/0147965 A1 6/2009 Kuo
(Continued)

*Primary Examiner* — Vivian C Chin
*Assistant Examiner* — Douglas J Suthers
(74) *Attorney, Agent, or Firm* — Chang-Hsing Liang

(57) ABSTRACT

The present invention provides a device for actively cancelling a target sound wavefront in an open space, the device comprising a signal processing module comprising at least one processor operatively coupled with a datastore, the at least one processor configured to: receive a data comprising one or more geographical features, and one or more audio features generated by one or more receiving microphones having a geographical relationship with an array of receiving microphones in an area adjacent to a user; process aid data using a prediction model adapting a trained deep learning framework; and provide output the inverse sound wavefront of the target sound at the area of said predicting microphones.

19 Claims, 4 Drawing Sheets

(56) References Cited

U.S. PATENT DOCUMENTS

| | | | | |
|---|---|---|---|---|
| 2012/0237049 | A1 * | 9/2012 | Brown | G10K 11/17885 381/71.1 |
| 2019/0088243 | A1 * | 3/2019 | Prasad | G10K 11/1754 |
| 2019/0368103 | A1 | 12/2019 | Choung | |
| 2020/0013423 | A1 | 1/2020 | Benway et al. | |

* cited by examiner

SYSTEM AND METHOD OF ACTIVE NOISE CANCELLATION IN OPEN FIELD

BACKGROUND OF THE INVENTION

Sound is a pressure wave, which consists of alternating periods of compression and rarefaction. A noise-cancellation speaker emits a sound wave with the same amplitude but with inverted phase (also known as antiphase) to the original sound. The waves combine to form a new wave, in a process called interference, and effectively cancel each other out—an effect which is called destructive interference. Active noise cancellation (ANC), also known as noise control, or active noise reduction (ANR), is a method for reducing unwanted sound by the addition of a second sound specifically designed to cancel the first.

ANC is generally achieved through the use of analog circuits or digital signal processing. Adaptive algorithms are designed to analyze the waveform of the background aural or nonaural noise, then based on the specific algorithm generate a signal that will either phase shift or invert the polarity of the original signal. This inverted signal (in antiphase) is then amplified and a transducer creates a sound wave directly proportional to the amplitude of the original waveform, creating destructive interference. This effectively reduces the volume of the perceivable noise.

A noise-cancellation speaker may be co-located with the sound source to be attenuated. Alternatively, the transducer emitting the cancellation signal may be located at the location where sound attenuation is wanted (e.g. the user's ear). This requires a much lower power level for cancellation but is effective only for a single user. Noise cancellation at other locations is more difficult as the three-dimensional wavefronts of the unwanted sound and the cancellation signal could match and create alternating zones of constructive and destructive interference, reducing noise in some spots while doubling noise in others.

SUMMARY OF THE INVENTION

In one aspect provides a device for actively cancelling a target sound wavefront in an open space, the device comprises: a signal processing module comprising at least one processor operatively coupled with a datastore, the at least one processor configured to: receive a data comprising one or more geographical features, and one or more audio features generated by one or more receiving microphones having a geographical relationship with an array of receiving microphones in an area adjacent to a user; process said data using a prediction model adapting a trained deep learning framework; and provide output the inverse sound wavefront of the target sound at the area of said predicting microphones.

In another aspect provides a system of the invention device for actively cancelling a target sound wavefront in an open space.

In yet another aspect provides a method for actively cancelling a target sound wavefront in an open space utilizes the device/system disclosed herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
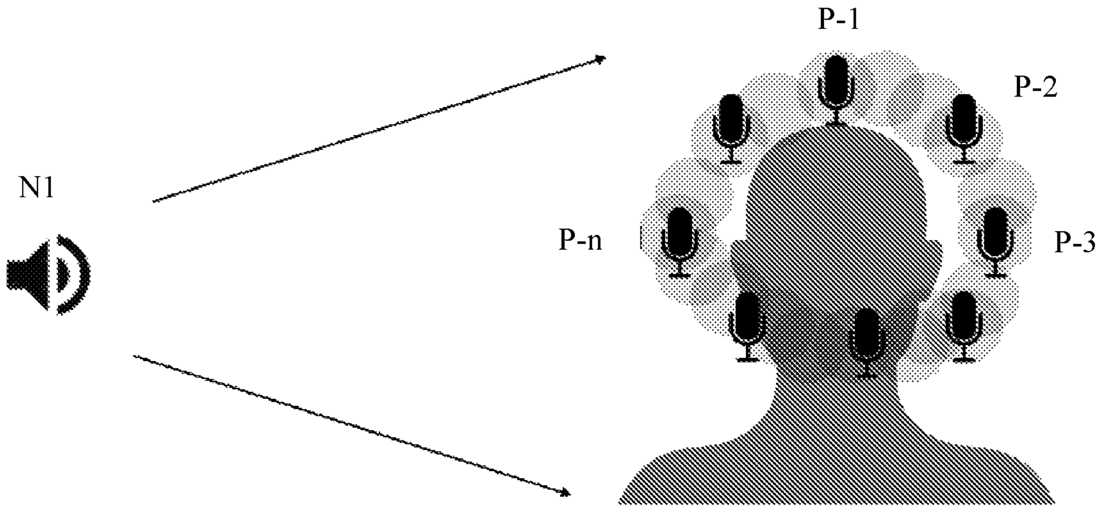
FIG. 1 illustrates a training model on how the data is collected.

Reference in the specification to "a specific embodiment" or a similar expression means that a particular feature, structure, or characteristic described in connection with the specific embodiment is included in at least one specific embodiment of the present invention. Therefore, in this specification, the appearance of the terms "in a specific embodiment" and similar expressions does not necessarily refer to the same specific embodiment.

In small enclosed spaces (e.g. the passenger compartment of a car) global noise reduction can be achieved via multiple speakers and feedback microphones, and measurement of the modal responses of the enclosure. In general, as disclosed previously, the known open field ANC system includes multiple directional microphones and speakers forming arrays to produce a noise cancellation wavefront that actively cancels an ambient sound wavefront. Such design has its limitations; for example, as the speakers are fixed in the open field, the cancellation of wavefront is limited to the specific area; but the user may be moving, not limited to said area. Also, such design is applicable only to low frequency sounds such as machinery noise, not effective for used in highway, or airplane environments, where other frequency sounds are ineffective to be cancelled.

Thus, there is in needs of an ANC device/system for used in an un-fixed transferrable open field.

In some embodiments provide a device for actively cancelling a target sound wavefront in an open space, the device comprises: a signal processing module comprising at least one processor operatively coupled with a datastore, the at least one processor configured to: receive a data comprising one or more geographical features, and one or more audio features generated by one or more receiving microphones having a geographical relationship with an array of receiving microphones in an area adjacent to a user; process said data using a prediction model adapting a trained deep learning framework; and provide output the inverse sound wavefront of the target sound at the area of said predicting microphones. In certain embodiments provide a device for actively cancelling a target sound wavefront in an open space consisting of: a signal processing module comprising at least one processor operatively coupled with a datastore, the at least one processor configured to: receive a data comprising one or more geographical features, and one or more audio features generated by one or more receiving microphones having a geographical relationship with an array of receiving microphones in an area adjacent to a user; process said data using a prediction model adapting a trained deep learning framework; and provide output the inverse sound wavefront of the target sound at the area of said predicting microphones.

In some embodiments, the device is a speaker or within a speaker. In some embodiments, the one or more receiving microphones are located on opposite sides of the user. In some embodiments, said deep learning framework is a generative adversarial network or a conditional generative adversarial network. In certain embodiments, said deep learning framework is a conditional generative adversarial network. In some embodiments, said array of predicting microphones has 1 to n numbers of predicting microphones. In some embodiments, the area of said array of predicting microphones is located within 30 cm, 25 cm, 20 cm, 15 cm, 10 cm, or 5 cm from said user (e.g., from the ear of the user). In some embodiments, the area of said array of predicting microphones is located between 1 cm to 50 cm, 1 to 40 cm, 1 to 30 cm, 1 to 25 cm, 1 to 20 cm, or 1 to 10 cm from said user (e.g., from the ear of the user). In certain embodiments, the array of predicting microphones is located between 5 cm to 10 cm from said user. In some embodiments, said device further comprises a monitoring means to monitor movement of said user. In certain embodiments, the monitoring means is a camera. In certain embodiments, said monitor means provides a geolocation feedback of user movement to said device allowing said device produces a noise cancellation wavefront automatically. In certain embodiments, said geolocation feedback comprises data of geographical feature and audio feature. In certain embodiments, said geographical feature comprises a distance and angle from the receiving microphone to a selected location of the predicting microphone.

In some embodiments, said target sound wavefront is an environmental noise of the open space. In some embodiments, said target sound wavefront is pre-recognized via a database, or via a pre-recorded means. In some embodiments, said pre-recognized target sound wavefront is isolated from all sounds received by said receiving microphones. In certain embodiments, said device produces a noise cancellation wavefront at a selected area by said user.

In some embodiments provide a system comprising the device disclosed herein and optionally an array of predicting microphones to provide accuracy feedback after the deep learning framework is trained. In certain embodiments, the signal processing module uses a prediction model for providing patterns of the sound in each location of said predicting microphones. In some embodiments, said deep learning framework is a conditional generative adversarial network. In some embodiments, said array of predicting microphones has 1 to n numbers of predicting microphones. In some embodiments, the area of said array of predicting microphones is located within 30 cm, 25 cm, 20 cm, 15 cm, 10 cm, or 5 cm from said user (e.g., from the ear of the user). In some embodiments, the area of said array of predicting microphones is located between 1 cm to 50 cm, 1 to 40 cm, 1 to 30 cm, 1 to 25 cm, 1 to 20 cm, or 1 to 10 cm from said user (e.g., from the ear of the user). In certain embodiments, the array of predicting microphones is located between 5 cm to 10 cm from said user. In some embodiments, said device further comprises a monitoring means to monitor movement of said user. In certain embodiments, the monitoring means is a camera. In certain embodiments, said monitor means provides geolocation feedback of user movement to said device allowing said device produces a noise cancellation wavefront automatically. In certain embodiments, said geolocation feedback comprises data of geographical feature and audio feature. In certain embodiments, said geographical feature comprises a distance and angle from the receiving microphone to a selected location of the predicting microphone.

In some embodiments, the receiving microphones are located at the same position of one or more speakers. In some embodiments, the one or more speakers comprise said signal processing module.

In some embodiments, the signal processing module comprises: at least one processor operatively coupled with a datastore, the at least one processor configured to: receive a data comprising one or more geographical features, and one or more audio features; process said data using a prediction model; and provide output patterns of the sound signals at each location of said predicting microphone.

In certain embodiments, said prediction model adapts a trained deep learning framework, or the like. In certain embodiments, said deep learning framework is a generative adversarial network (GAN) or a conditional generative adversarial network (GAN).

A generative adversarial network (GAN) is a class of machine learning frameworks where two neural networks contest with each other. Given a training set, this technique learns to generate new data with the same statistics as the training set. For example, a GAN trained on photographs can generate new photographs that look at least superficially authentic to human observers, having many realistic characteristics. Though originally proposed as a form of generative model for unsupervised learning, GANs have also proven useful for semi-supervised learning, fully supervised learning, and reinforcement learning. The core idea of a GAN is based on the "indirect" training through the discriminator, which itself is also being updated dynamically. This basically means that the generator (e.g., a model for creating new data based on original data) is not trained to minimize the distance to a specific image, but rather to fool the discriminator (a model for recognizing a pattern of data and determines whether inputted data is original data or fake data generated from the generator). This enables the model to learn in an unsupervised manner. The generative network generates candidates while the discriminative network evaluates them. The contest operates in terms of data distributions. Typically, the generative network learns to map from a latent space to a data distribution of interest, while the discriminative network distinguishes candidates produced by the generator from the true data distribution. The generative network's training objective is to increase the error rate of the discriminative network (i.e., "fool" the discriminator network by producing novel candidates that the discriminator thinks are not synthesized (are part of the true data distribution)). A known dataset serves as the initial training data for the discriminator. Training it involves presenting it with samples from the training dataset, until it achieves acceptable accuracy. The generator trains based on whether it succeeds in fooling the discriminator. Typically, the generator is seeded with randomized input that is sampled from a predefined latent space (e.g. a multivariate normal distribution). Thereafter, candidates synthesized by the generator are evaluated by the discriminator.

Generative Adversarial Networks (GAN) were recently introduced as a novel way to train generative models. A conditional version of generative adversarial network is constructed by simply feeding the data, y, conditioned on to both the generator and discriminator. This model can generate MNIST digits conditioned on class labels and can be used to learn a multi-modal model, generating descriptive tags which are not part of training labels.

In some embodiments, a device/system for actively cancelling a target sound wavefront (i.e., a sound of interest) in an open space utilizes a deep learning framework to achieve APN in an un-fixed open field. For example, a conditional GAN may be used, where two neural networks contest and learn with each other from the specific source of sounds. Given a training set, this technique learns to generate new data with the same statistics as the training set.

FIG. 1 illustrates how the data is collected during a training mode. A noise, N1, is generated and collected by n numbers of predicting microphones (e.g., P-1, P-2, P-3, . . . , to P-n) at various locations where the signals produced by each microphone are processed by the signal processing module utilizing a deep learning framework (e.g., a conditional GAN) to learn patterns of sounds at different locations.

In some embodiments, said array of predicting microphones has 1 to n numbers of predicting microphones. In certain embodiments, the area of said array of predicting microphones is located within 30 cm, 25 cm, 20 cm, 15 cm, 10 cm, or 5 cm from said user (i.e., from each ear of said user). In certain embodiments, the area of said array of predicting microphones is located between 1 cm to 50 cm, 1 to 40 cm, 1 to 30 cm, 1 to 25 cm, 1 to 20 cm, or 1 to 10 cm from said user. In certain embodiments, the array of predicting microphones is located between 5 cm to 10 cm from said user.

Once the deep learning framework is trained (exemplified in FIG. 2B), the prediction model can predict the sound received by a predicting microphone (e.g., mic P-1, P-2, P-3, P-4, . . . , etc.) at a set position based on the sounds/noises received by the receiving microphones, e.g., microphone 101 and 102 located in Speaker 10. See FIG. 2A. In some embodiments, the receiving microphones are located on opposite sides of the user. In some embodiments, the system comprises one or more speakers. In certain embodiments, the system comprises two, three, four, or more than four speakers. In certain embodiments, the system comprises two speakers located on opposite side of the user.

Figure 2A:
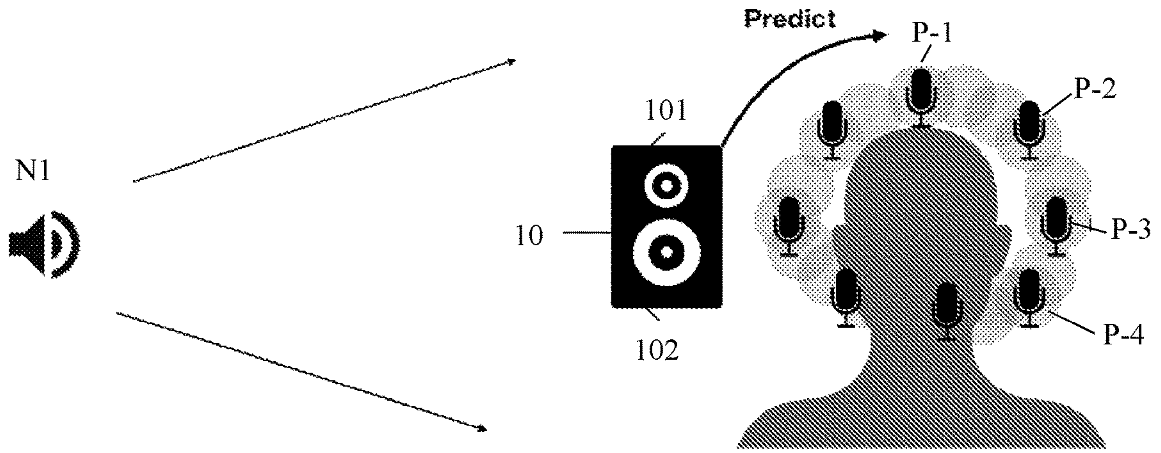
FIG. 2A shows an exemplary illustration on how to use an exemplary receiving microphone 101 and 102 in the process to predict what would be received by a predicting microphone P-1.

With the predicted sound at the position of P-1, its reverse wave is produced and added by a speaker comprising a signal processing module (for example a speaker 10 with the receiving microphones 101 and 102) to offset the noise N1 to achieve ANC. The receiving microphones are configured to receive sound signals produced by an array of n numbers of predicting microphones in an area, wherein the predicting microphones have a geographical relationship (e.g., geographical features) with the receiving microphones as shown in FIG. 2A.

Figure 2B:
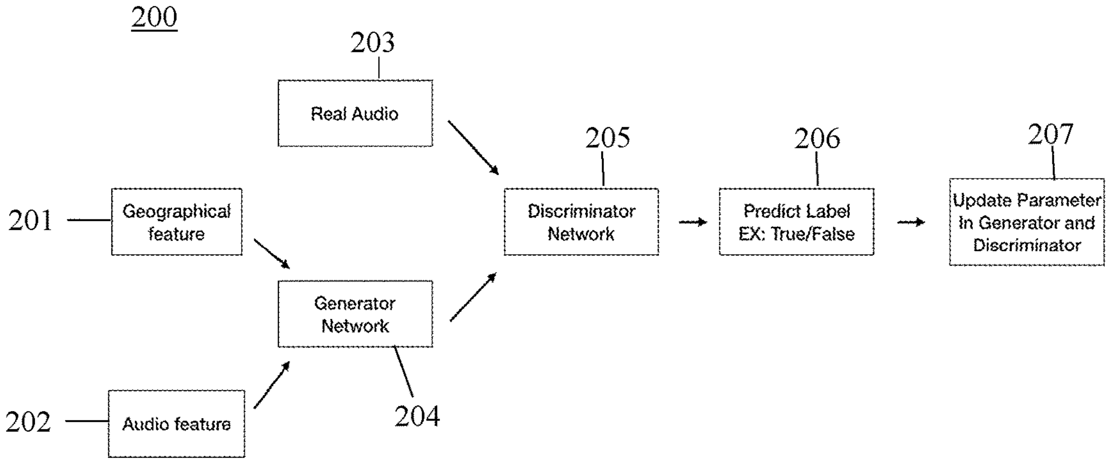
FIG. 2B provides a flowchart illustrating a process 200 in a training mode processed by GAN to predict the artificial sound based on the real sounds.

FIG. 2B is a flowchart illustrating a process 200 in a training mode processed by GAN to predict the artificial sound based on the real sounds. First, data comprising geographical feature 201 and audio feature 202 is input to Generator Network 204. The output from the generator network is compared with the input of a real audio, 203, by Discriminator Network 205 to predict label (e.g., true or false) at step 206. Lastly, the output parameter of the predicted label is updated in Generator and Discriminator at step 207. In some embodiments, the geographical feature comprises a distance between a predicting microphone (e.g., mic P-1) and a receiving microphone (e.g., mic 101).

Figure 2C:
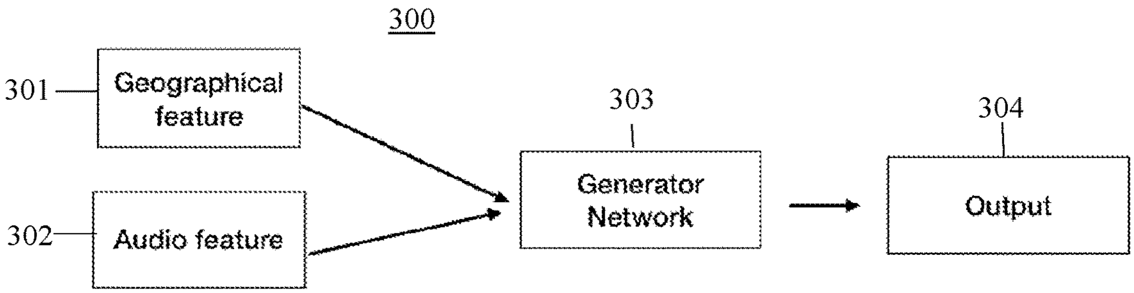
FIG. 2C provides a flowchart illustrating a process 300 in an inference mode processed by GAN.

FIG. 2C a flowchart illustrating a process 300 in an inference mode processed by GAN. For example, after given the geographical feature 301 such as the distance and angle (e.g., from mic P-1, mic P-2, etc. to a receiving microphone 101), and an audio feature 302 (i.e., audio data) to Generator Network 303, an output 304 is generated.

Figure 2D:
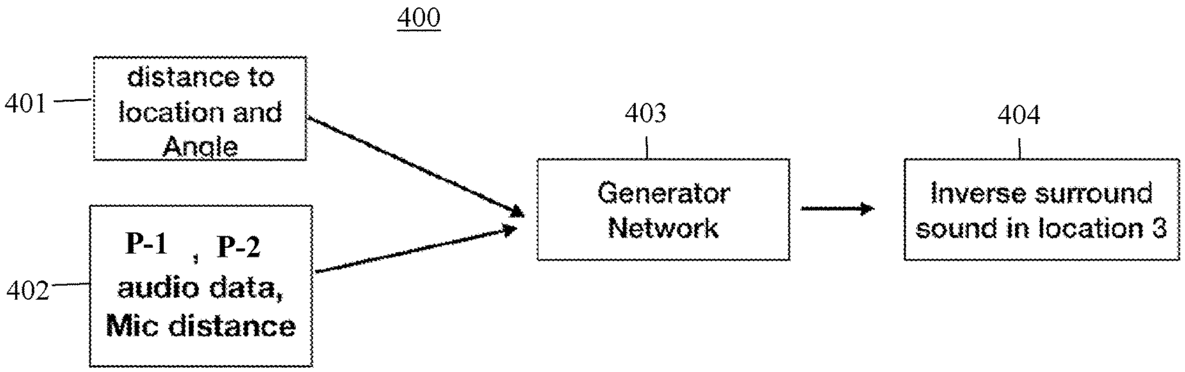
FIG. 2D provides a flowchart illustrating a process 400 in an inference mode processed by GAN.
Figure 2E:
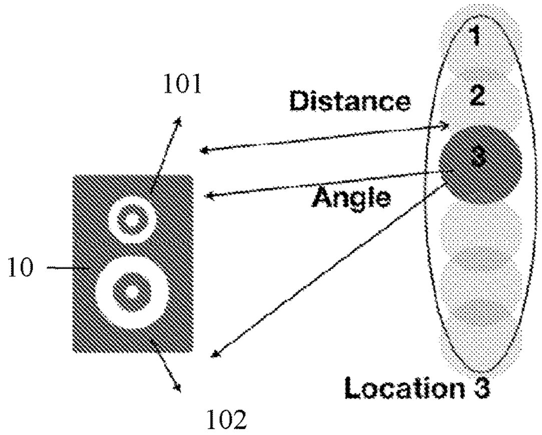
FIG. 2E shows an exemplary illustration corresponding to FIG. 2D defining the distance and angle from an exemplary location (e.g., location 3) to the receiving microphones 101 and 102.

In a particular instance as shown in process 400, the particular data 401 comprising distance and angle to a selected location (e.g., location 3) and the data set 402 comprising predicting microphone (e.g., P-1, P-2) audio data and distance at e.g., location 3 are fed to Generator Network 403 to prepare an inverse surround sound in location 3 at step 404 as illustrated in FIG. 2D. FIG. 2E illustrates an exemplary geographical feature of the process 400 (corresponding to FIG. 2D), in particular the distance and angle from a selected location 3 to the receiving microphones 101 and 102 located in Speaker 10.

Although the predicting microphones are used in a training mode, said predicting microphones are not necessarily removed after the training mode. In some embodiments, the predicting microphones are used in the invention system to provide accuracy feedback after the deep learning framework is trained. For example, after GAN is trained, if a predicting microphone remains at the selected location 3, said microphone may provide data received at location 3 to the prediction model in the system to adjust and prepare a more accurate inverse sound wavefront for ANC.

The device/system further comprises a signal processing module configured to receive the sounds from said array of predicting microphones for learning patterns of sounds in each location of said predicting microphones in said area and transmitting a control signal to one or more speakers (comprising a signal processing module) configured to produce a noise cancellation wavefront, wherein the noise cancellation wavefront and the target sound wave are equal in magnitude and inverse in polarity.

On the same manner, the noise cancellation can be applied to other predicting microphones (e.g., mic P-1 to mic P-n as shown) with the fixed positions from the exemplary mic 101/mic 102 (providing the geographical relationship). This would be effectively allowing the user to move around the area where the predicting microphones are located. In some embodiments, in a practical manner, the positions near the user ears would be most useful and effective for noise cancellation, since the farther away from the ears the more variables (e.g., echo, environmental sounds etc.) would interfere the training data and noise cancellation effect. In some embodiments, a directional microphone is used with a better effect because of the more directed sounds.

Enhanced Noise Reduction of Specific Sounds

Similarly, the system and method of ANC in an un-fixed open field apply to specific sound cancellation, for example applying to a specific environmental noise. Such application may be based on the teaching of WO2019228329A1.

In comparison with the general noise reduction as shown in FIG. 2A, in this application, a specific sound/noise of interest can be targeted based on the sound patterns.

Figure 3A:
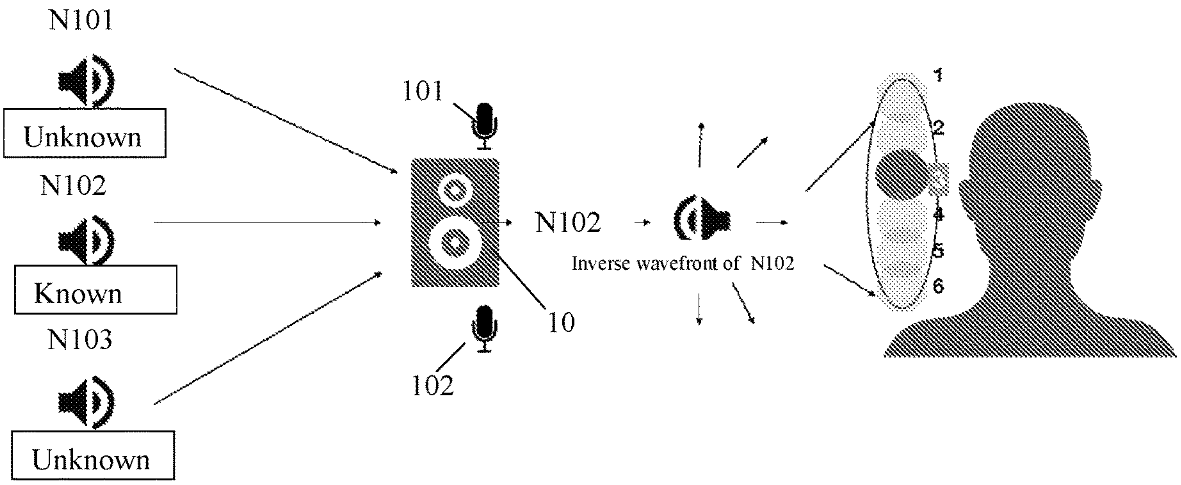
FIG. 3A shows an exemplary illustration on how to use an exemplary receiving microphone 101 and 102 (showing outside the speaker 10) to predict and provide the reverse sound (i.e., wavefront) of a pre-recognized sound N102 at for example location 3.

As illustrated in FIG. 3A, the "general noises" include for example, N101, N102, N103, . . . , etc. (any known or unknown noises). Sound N102 ("noise N102"), which is pre-recognized (known), e.g., by a known source in a database, or via a pre-recorded and processed means (e.g., via a prior recording device before applying ANC), among other unknown, or non-targeted sounds (e.g., N101, N103 and other sounds). The known sound is processed via the same or similar manner as disclosed in WO2019228329A1.

With the application of the pre-recognized sound N102 (received via one or more receiving microphones (e.g., 101 and 102) at the fixed positions (e.g., at location 3), the device/system first isolates sound N102 from all known and unknown collected sounds, and then the signal processing module produces signals for the prediction model to process and predict. The speaker 10 then produces and adds the inverted phase of sound N102 (the inverse wavefront of N102) based on the predictions to achieve ANC to any selected area e.g., location 3 based on the known sound N102. On the same manner, the noise cancellation can be applied to other areas (e.g., areas 1 to 6 as shown, or any areas/locations around the user) selected by the user.

Figure 3B:
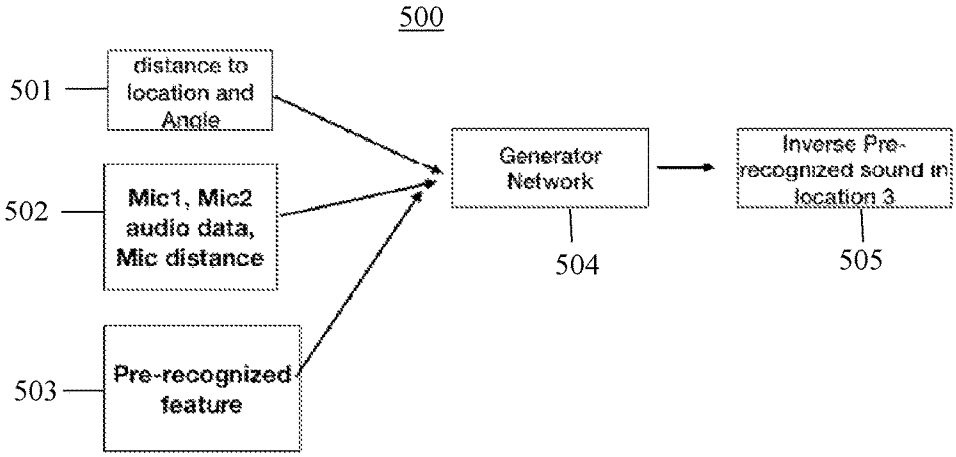
FIG. 3B provides a flowchart illustrating a process 500 corresponding to FIG. 3A in an inference mode processed by GAN.

FIG. 3B further illustrates an exemplary geographical feature of the process 500, where the particular data 501 comprising distance and angle to a selected location (e.g., area 3), the data set 502 comprising predicting microphone audio data (e.g., mic P-1, P-2, etc.) and distance from for example the selected area 3, and certain data 503 of pre-recognized features are fed to generator network 504 to be processed for generating inverse pre-recognized sound (i.e., sound N102) in location 3 at step 505 to cancel N102 sound.

Alternatively, a monitor system (e.g., a camera, video recording device, etc.) may be used to provide location feedback (e.g., the distances and angles between the predicting microphones and the user; the distances and angles from the receiving microphones to the predicting microphones) to the prediction model used in the device/system re the movement of the user therefore to adjust the denoise area automatically.

This prediction model is used to predict and/or produce a processed sound wavefront at different positions. In some embodiments, the effective range for ANC is within 30 cm, 25 cm, 20 cm, 15 cm, 10 cm or 5 cm from the user. In some embodiments, the effective range is between 1 cm to 50 cm, 1 to 40 cm, 1 to 30 cm, 1 to 25 cm, 1 to 20 cm, or 1 to 10 cm from the user. In certain embodiments, the effective range is between 5 cm to 10 cm.

In some embodiments, said target sound wavefront is an environmental noise of the open space. In other embodiments, said target sound wavefront is pre-recognized via a database, or via a pre-recorded means. In some embodiments, said pre-recognized target sound wavefront is isolated from all sounds received by said receiving microphones. In certain embodiments, said speaker produces a noise cancellation wavefront at a selected area by said user.

In some embodiments, said device further comprises a monitoring means to monitor movement of said user. In certain embodiments, said monitor means provides location feedback of user movement to said device allowing said speaker produces a noise cancellation wavefront automatically.

It should be understood that the processed pre-recognized sound may be input via a wireless communication means between the invention device/system and the external sound processing device such as a Bluetooth, infrared, or Wi-Fi. In some embodiments, the communication between the invention device/system and the external sound processing device is not limited to direct point-to-point communication. In some embodiments, it may also be through a local area network, a mobile phone network, or the Internet.

Those of ordinary skill in the art will readily recognize that the present invention may be implemented as a devise/system comprising a computer system/apparatus, method, or a computer-readable medium. Therefore, the present invention can be implemented in various forms, such as a complete hardware embodiment, a device/system with a complete software embodiment (including firmware, resident software, microprogram code, etc.), or can also be implemented as a software and hardware implementation form. It will be called "circuit", "module" or "system" hereinafter. In addition, the present invention may also be implemented as a computer program product in the form of any tangible medium having computer-usable program code stored thereon.

Any combination of one or more computer-usable or readable media may be utilized. For example, a computer-useable or readable medium may be, but is not limited to, an electronic, magnetic, optical, electromagnetic, infrared, or semiconductor system, apparatus, device, or propagation medium. More specific examples of computer-readable media may include the following (non-limiting examples): electrical connections consisting of one or more connecting wires, portable computer diskettes, hard disk drives, random access memory (RAM), read-only memory (ROM), erasable programmable read-only memory (EPROM or flash memory), optical fiber, portable compact disc (CD-ROM), optical storage devices, transmission media (such as the Internet (Internet) or intranet (intranet), or magnetic storage devices. It should be noted that the computer-usable or readable medium may also be paper or any suitable medium that can be used to print the program thereon so that the program can be re-electronicized, such as by optically scanning the paper or other Media, and then compile, interpret, or other suitable necessary processing methods, and then can be stored in computer memory again. As used herein, a computer-usable or readable medium may be any medium for holding, storing, transmitting, propagating, or transmitting program code for processing by an instruction execution system, apparatus, or device connected thereto. The computer-usable medium may include a propagation data signal in which the computer-usable program code is stored, whether in the form of a baseband or a partial carrier wave. The computer may use any suitable medium for transmission of program code, including (but not limited to) wireless, wired, optical fiber cable, radio frequency (RF), and the like.

The description of the present invention may include flowcharts and/or block diagrams of systems, devices, methods and computer program products according to specific embodiments of the present invention. It is understood that each block in the flowchart and/or block diagram and any combination of blocks in the flowchart and/or block diagram, can be implemented using computer program instructions. These computer program instructions may be executed by a processor of a general-purpose computer or special computer or a machine composed of other programmable data processing devices. These computer program instructions may also be stored on a computer-readable medium to instruct a computer or other programmable data processing device to perform a specific function, which includes instructions to implement the functions or operations described in the flowcharts and/or block diagrams. Computer program instructions can also be loaded on a computer or other programmable data processing device to facilitate a system operation step on the computer or other programmable device, and execute the instructions on the computer or other programmable device. A computer-implemented program is generated from time to time to achieve the functions or operations illustrated in the flowcharts and/or block diagrams.

In some embodiments provide a method for actively cancelling a target sound wavefront in an open space comprising: receiving the target sound wavefront; performing target sound cancellation using a prediction model which is trained using two or more receiving microphones configured to receive sound signals produced by an array of predicting microphones in an area adjacent to user to receive the target wavefront, wherein the predicting microphones have a geographical relationship with the receiving microphones, and generating a noise cancellation wavefront of the target sound equal in magnitude and inverse in polarity by a signal processing module configured to receive the sounds from said array of predicting microphones for learning patterns of sounds in each location of the predicting microphones in said area and transmit a control signal to one or more speakers configured to produce a noise cancellation wavefront. In some embodiments, the prediction model adapts a deep learning framework. In some embodiments, said deep learning framework is a generative adversarial network or a conditional generative adversarial network. In some embodiments, said method further comprises monitoring movement of said user by a monitoring means. In certain embodiments, said monitor means provides geolocation feedback of user movement to the signal processing module allowing said signal processing module produces a noise cancellation wavefront automatically. In certain embodiments, said geolocation feedback comprises data of geographical feature and audio feature. In some embodiments, said array of predicting microphones has 1 to n numbers of predicting microphones. In some embodiments, the area of said array of predicting microphones is located within 30 cm, 25 cm, 20 cm, 15 cm, 10 cm, or 5 cm from said user (e.g., from the ear of the user). In some embodiments, the area of said array of predicting microphones is located between 1 cm to 50 cm, 1 to 40 cm, 1 to 30 cm, 1 to 25 cm, 1 to 20 cm, or 1 to 10 cm from said user (e.g., from the ear of the user). In certain embodiments, the array of predicting microphones is located between 5 cm to 10 cm from said user. In some embodiments, said device further comprises a monitoring means to monitor movement of said user. In certain embodiments, the monitoring means is a camera. In certain embodiments, said monitor means provides geolocation feedback of user movement to said device allowing said device produces a noise cancellation wavefront automatically. In certain embodiments, said geolocation feedback comprises data of geographical feature and audio feature. In certain embodiments, said geographical feature comprises a distance and angle from the receiving microphone to a selected location of the predicting microphone. In certain embodiments provide a method for actively cancelling a target sound wavefront in an open space consisting of: receiving the target sound wavefront; performing target sound cancellation using a prediction model which is trained using two or more receiving microphones configured to receive sound signals produced by an array of predicting microphones in an area adjacent to an user to receive the target wavefront, wherein the predicting microphones have a geographical relationship with the receiving microphones, and generating a noise cancellation wavefront of the target sound equal in magnitude and inverse in polarity by a signal processing module configured to receive the sounds from said array of predicting microphones for learning patterns of sounds in each location of the predicting microphones in said area and transmit a control signal to one or more speakers configured to produce a noise cancellation wavefront.

In some embodiments, said target sound wavefront is an environmental noise of the open space. In some embodiments, said target sound wavefront is pre-recognized via a database, or via a pre-recorded means. In some embodiments, said pre-recognized target sound wavefront is isolated from all sounds received by said receiving microphones. In certain embodiments, said device produces a noise cancellation wavefront at a selected area by said user.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A device for actively cancelling a target sound wavefront in an open space, the device comprising:

a signal processing module comprising at least one processor operatively coupled with a datastore, the at least one processor configured to:

receive a data comprising one or more geographical features, and one or more audio features generated by one or more receiving microphones having a geographical relationship with an array of predicting microphones in an area adjacent to a user;

process said data using a prediction model adapting a trained deep learning framework; and provide output the inverse sound wavefront of the target sound at the area of said predicting microphones, wherein said target sound wavefront is isolated from all sounds received by said receiving microphones and is pre-recognized via a database, or via a pre-recorded means.

2. The device of claim 1, wherein the device comprises a speaker.

3. The device of claim 1, wherein the one or more receiving microphones are located on opposite sides of the user.

4. The device of claim 1, wherein said deep learning framework is a generative adversarial network or a conditional generative adversarial network.

5. The device of claim 1, wherein said array of predicting microphones has 1 to n numbers of predicting microphones, wherein n is an integer greater than 1.

6. The device of claim 5, wherein the area of said array of predicting microphones is located within 30 cm, 25 cm, 20 cm, 15 cm, 10 cm, or 5 cm from said user.

7. The device of claim 5, wherein the area of said array of predicting microphones is located between 1 cm to 50 cm, 1 to 40 cm, 1 to 30 cm, 1 to 25 cm, 1 to 20 cm, or 1 to 10 cm from said user.

8. The device of claim 7, wherein the array of predicting microphones is located between 5 cm to 10 cm from said user.

9. The device of claim 1, wherein said target sound wavefront is an environmental noise of the open space.

10. The device of claim 1, wherein said target sound wavefront is pre-recognized via a database, or via a pre-recorded means.

11. The device of claim 1, wherein said device produces a noise cancellation wavefront at a selected area by said user.

12. The device of claim 1, wherein said device further comprises a monitoring means to monitor movement of said user.

13. The device of claim 12, wherein said monitor means provides geolocation feedback of user movement to said device allowing said device produces a noise cancellation wavefront automatically.

14. The device of claim 12, wherein said geolocation feedback comprises data of geographical feature and audio feature.

15. The device of claim 1, wherein said geographical feature comprises a distance and angle from the receiving microphone to a selected location of the predicting microphone.

16. A system for actively cancelling a target sound wavefront in an open space comprising a device of claim 1 with the array of predicting microphones to provide accuracy feedback after the deep learning framework is trained.

17. The system of claim 16, wherein the signal processing module uses a prediction model for providing patterns of the sound in each location of said predicting microphones.

18. A method for actively cancelling a target sound wavefront in an open space comprising:

receiving the target sound wavefront;

performing target sound cancellation using a prediction model which is trained using two or more receiving microphones configured to receive sound signals produced by an array of predicting microphones in an area adjacent to an user to receive the target wavefront, wherein the predicting microphones have a geographical relationship with the receiving microphones, and generating a noise cancellation wavefront of the target sound equal in magnitude and inverse in polarity by a signal processing module configured to receive the sounds from said array of predicting microphones for learning patterns of sounds in each location of the predicting microphones in said area and transmit a control signal to one or more speakers configured to produce a noise cancellation wavefront, wherein said target sound wavefront is isolated from all sounds received by said receiving microphones and is pre-recognized via a database, or via a pre-recorded means.

19. The method of claim 18, wherein the prediction model adapts a deep learning framework.

* * * * *